(12) United States Patent
Matsunaga et al.

(10) Patent No.: US 7,260,886 B2
(45) Date of Patent: Aug. 28, 2007

(54) FASTENING A MAGNETIC DISK TO A HUB STRUCTURE

(75) Inventors: Yuhichiroh Matsunaga, Kanagawa (JP); Takashi Nishikawa, Kanagawa (JP); Mutsuo Satoh, Kanagawa (JP); Mitsuru Kitamura, Kanagawa (JP); Minoru Kamada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/273,939

(22) Filed: Nov. 14, 2005

(65) Prior Publication Data

US 2006/0107520 A1 May 25, 2006

(30) Foreign Application Priority Data

Nov. 24, 2004 (JP) ............................. 2004-338665

(51) Int. Cl.
*G11B 5/127* (2006.01)
*G11B 5/60* (2006.01)

(52) U.S. Cl. .............................. 29/603.03; 29/603.04; 29/603.07; 29/737; 360/234.5

(58) Field of Classification Search ............. 29/603.03, 29/603.06, 603.04, 737; 360/265.7, 244.2, 360/106, 105, 235.4, 234.2, 240; 310/90.5, 310/90, 91
See application file for complete search history.

(56) References Cited

U.S. PATENT DOCUMENTS 5,369,538 A * 11/1994 Moe et al. ............... 360/265.1
5,467,237 A * 11/1995 Takahashi ................. 369/13.1
5,841,607 A * 11/1998 Khan et al. .............. 360/99.08
6,243,230 B1 * 6/2001 Nii et al. ................ 360/99.08

FOREIGN PATENT DOCUMENTS

JP 09-265702 10/1997
JP 2004-199760 7/2004

* cited by examiner

*Primary Examiner*—A. Dexter Tugbang
*Assistant Examiner*—Tai Van Nguyen
(74) *Attorney, Agent, or Firm*—Townsend and Townsend and Crew LLP; Duke Amaniampong

(57) ABSTRACT

Embodiments of the invention provide a clamping mechanism capable of clamping a magnetic disk by an accurate fastening force. In one embodiment, a magnetic disk fastening method includes the steps of: mounting a magnetic disk on a hub structure, setting a thin plate spring having a pressure-bearing part, a flexible part and a disk holding part at a predetermined position relative to the magnetic disk with the disk holding part in contact with a surface of the magnetic disk; pressing the pressure-bearing part by screwing a fastening screw in a threaded hole formed in the hub structure; measuring a deflection by which the flexible part is deflected in the pressure-bearing part pressing step; and stopping pressing the magnetic disk upon the increase of the deflection to a predetermined value.

14 Claims, 6 Drawing Sheets

(A)

(B)

FASTENING A MAGNETIC DISK TO A HUB STRUCTURE

CROSS-REFERENCES TO RELATED APPLICATIONS

This application claims priority from Japanese Patent Application No. JP2004-338665, filed Nov. 24, 2004, the entire disclosure of which is incorporated herein by reference.

BACKGROUND OF THE INVENTION

The present invention relates to a technique for fastening a magnetic disk to a hub structure by a clamping mechanism. More specifically, the present invention relates to a technique for fastening a magnetic disk to a hub structure by a clamping mechanism, capable of accurately controlling fastening pressure exerted by the clamping mechanism.

In a magnetic disk drive, a magnetic disk, namely, a recording medium, is fastened to a hub, a spindle motor is formed by a coil stator incorporated into the hub and a magnet, and the magnetic disk is driven for rotation by the spindle motor. Generally, the magnetic disk is fastened to the hub by a clamping mechanism. The clamping mechanism fastens the magnetic disk to the hub by pressing the magnetic disk placed on the hub so that the hub is fitted in a circular through hole formed in a central part of the magnetic disk by a thin plate spring, namely, a dished, thin metal plate, and screwing a fastening screw in a threaded hole of the hub so as to apply a proper fastening pressure to the magnetic disk by the thin plate spring.

A clamping mechanism for holding a magnetic disk having a magnetic recording surface and provided with a central hole is illustrated in FIG. 6 of Patent document 1 (Japanese Patent Laid-Open 2004-199760). The magnetic recording surface is provided with a clamping boss to be fitted in the central hole of the magnetic disk, a spring member fixed to the clamping boss to press the magnetic disk against the clamping boss, and a spacing ring placed between the magnetic disk and the spring member. The spacing ring engages loosely with a stepped part formed around the central hole of the magnetic disk.

When the clamping mechanism fastens the magnetic disk to the clamping boss, the fastening pressure exerted by the spring member on the magnetic disk must be properly managed. The magnetic disk will be dislocated when an external shock is given to the magnetic disk drive and servo data cannot be read if the fastening pressure is excessively low. The magnetic disk will be excessively distorted, the surface of the magnetic disk rises and the accuracy of servo control of the tracking operation of a head slider is deteriorated and the head slider collides against the surface of the magnetic disk if the fastening pressure is excessively high. The relation between the deflection of a conical spring employed in such a clamping mechanism and clamping force or fastening pressure is disclosed in Patent document 2 (Japanese Patent Laid-Open 9-265702). Patent document 2 shows that there is a certain relation between the deflection of the conical spring and the fastening pressure.

Generally, a thin plate spring included in a clamping mechanism is provided in its central part with a through hole through which a fastening screw is passed. The thin plate spring is put in place on a magnetic disk mounted on a hub and the fastening screw is screwed through the through hole in a threaded hole formed in a central part of the hub. Then, the thin plate spring is deflected gradually as fastening pressure applied thereto increases. A torque applied to a torque driver to screw the fastening screw in the threaded hole is used for managing the fastening pressure applied by the clamping mechanism to the magnetic disk. Torque necessary for turning the fastening screw increases as an axial force acting on the fastening screw increases due to increase in the deflection of the thin plate spring. Therefore, the conventional magnetic disk drive is able to manage the fastening pressure on the basis of the torque applied to the torque driver.

BRIEF SUMMARY OF THE INVENTION

Recording density in which magnetic disk drive records data in the magnetic disk has progressively increased and the gap between the head slider and the surface of the magnetic disk has progressively decreased in recent years. Consequently, the importance of the accurate management of the fastening pressure for pressing the magnetic disk has increased for the improvement of the accuracy of servo control. The relation between the torque for turning the fastening screw and the axial force in the clamping mechanism is dependent on many parameters including friction acting between the fastening screw and the thin plate spring, dimensional tolerance for the manufacture of the fastening screw, fastening screw rotating speed at which the fastening screw is rotated for fastening and the accuracy of torque indicated by the fastening tool used for rotating the fastening screw. Thus, it is difficult to press the thin plate spring with the fastening screw so that a recently desired accurately managed fastening pressure may be applied to the thin plate spring.

An improved fastening pressure managing method is desired instead of the fastening pressure managing method using the fastening torque applied to the fastening torque for managing the fastening pressure. Accordingly, it is a feature of the present invention to provide a magnetic disk drive producing method of producing a magnetic disk drive provided with a magnetic disk fastened to a hub structure by an accurate fastening pressure. Another feature of the present invention is to provide a magnetic disk fastening method capable of fastening a magnetic disk by a clamping mechanism to a hub structure by accurate fastening pressure. A third feature of the present invention is to provide a magnetic disk drive assembling device capable of fastening a magnetic disk to a hub by an accurate fastening pressure.

The principle of the present invention is to manage the tightening degree of the fastening screw on the basis of the deflection of the thin plate spring most closely connected with fastening pressure that may be applied to the magnetic disk when the magnetic disk is fastened to the hub structure by the clamping mechanism. A magnetic disk fastening method of fastening a magnetic disk to a hub structure in a first aspect of the present invention comprises the steps of: mounting the magnetic disk on the hub structure; setting a thin plate spring having a pressure-bearing part, a flexible part and a disk holding part at a predetermined position relative to the magnetic disk with the disk holding part in contact with a surface of the magnetic disk; pressing the magnetic disk by the disk holding part by screwing a fastening screw in a threaded hole formed in the hub structure; measuring a deflection by which the flexible part is deflected in the step of pressing the magnetic disk; and stopping pressing the magnetic disk upon the increase of the deflection to a predetermined value.

The flexible part of the thin plate spring is deflected when the fastening screw is screwed in the threaded hole to press the disk holding part elastically against the surface of the magnetic disk to fasten the magnetic disk to the hub structure. The step of pressing the pressure-bearing part is stopped upon the increase of the measured deflection of the thin plate spring to a predetermined value. Therefore, the time for stopping screwing the fastening screw to apply a predetermined fastening pressure to the magnetic disk can be controlled on the basis of a direct parameter instead of an indirect parameter such as torque for turning the fastening screw.

The pressure-bearing part may surround a through hole formed in a part, with which the head of the fastening screw comes into contact, of the thin plate spring. Fastening pressure may be applied to the pressure-bearing part of the thin plate spring by pressing a different pressing member for pressing the thin plate spring with the fastening screw. The deflection of the thin plate spring may be directly measured. However, the deflection can be easily determined by measuring the position of a probe that changes its position according to the deflection of the thin plate spring.

Measurement error in a measured deflection can be reduced by setting a point of measurement in the vicinity of the most greatly deflected pressure-bearing part. When the thin plate spring is a dished thin plate spring provided in its central part with a through hole through which the fastening screw is passed and having a disk holding part in a peripheral part, and a flexible part extending between the through hole and the disk holding part, the clamping mechanism is able to press the magnetic disk against the hub structure by uniformly applying fastening pressure to the magnetic disk with respect to a circumferential direction.

A magnetic disk attaching machine in a second aspect of the present invention for attaching a magnetic disk to a hub structure by pressing the magnetic disk against the hub structure with a thin plate spring provided with a through hole and having a flexible part, a pressure-bearing part and a disk holding part includes: a screw driving member supported for rotation and having a holding head holding a screw driving tool suitable for driving a fastening screw; a sleeve internally holding the screw driving member and so elastically pressed against the flexible part as to deflect the elastic part; a deflection measuring unit for measuring the displacement of the sleeve displaced according to the deflection of the defecting part deflected by screwing a fastening screw through the through hole in a threaded hole formed in the hub structure by the screw driving member; and a controller for controlling the screw driving member and the deflection measuring unit.

The magnetic disk attaching machine of the present invention includes the screw driving member, the sleeve, the deflection measuring unit and the controller. The position of the sleeve changes according to the deflection of the flexible part when the screw driving member screws the fastening screw in the threaded hole. Therefore, the displacement of the sleeve corresponds to the deflection. The controller is able to determine the time for stopping the screwing operation of the screw driving member on the basis of data on the displacement of the sleeve received from the deflection measuring unit. Thus present invention is capable of adjusting the fastening force more accurately than the method of managing the torque applied to the fastening screw.

Measurement of the deflection by a noncontact measuring method that projects a beam of electromagnetic radiation, such as a laser beam or an infrared ray, on a reflecting surface formed on the probe and capable of reflecting a beam of electromagnetic radiation does not need to apply an extra force through the sleeve to the flexible part and hence measurement error in the measured deflection can be reduced. When an end of the sleeve is elastically pressed against a flat region of the flexible part surrounding the through hole, it is possible to prevent producing errors due to the positional change of the sleeve in contact with the flexible part relative to the flexible part during deflection measurement. When a deflection by which the thin spring plate pressed by the sleeve is deflected is not greater than about 5% of a deflection at the completion of fastening the magnetic disk with the fastening screw, the sleeve is able to follow the deflection of the flexible part satisfactorily and measurement error in the measured deflection can be reduced.

A magnetic disk drive manufacturing method in a third aspect of the present invention comprises the steps of: attaching a hub structure to a base; mounting a magnetic disk on the hub structure; setting a thin plate spring having a pressure-bearing part to be pressed by a fastening screw, a flexible part and a disk holding part at a predetermined position relative to the magnetic disk with the disk holding part in contact with a surface of the magnetic disk; pressing the magnetic disk with the pressure-bearing part by screwing a fastening screw in a threaded hole formed in the hub structure; measuring a deflection by which the flexible part is deflected in the step of pressing the magnetic disk; and stopping pressing the magnetic disk upon the increase of the deflection to a predetermined value.

The present invention provides the method of producing the magnetic disk drive in which the magnetic disk is fastened to the hub structure by applying an accurate fastening pressure to the clamping mechanism. The present invention provides the magnetic disk fastening method capable of attaching the magnetic disk to the hub structure by applying an accurate fastening pressure to the magnetic disk by the clamping mechanism. The present invention provides the magnetic disk attaching deice capable of attaching the magnetic disk to the hub structure by an accurate fastening pressure.

DETAILED DESCRIPTION OF THE INVENTION

Figure 1:
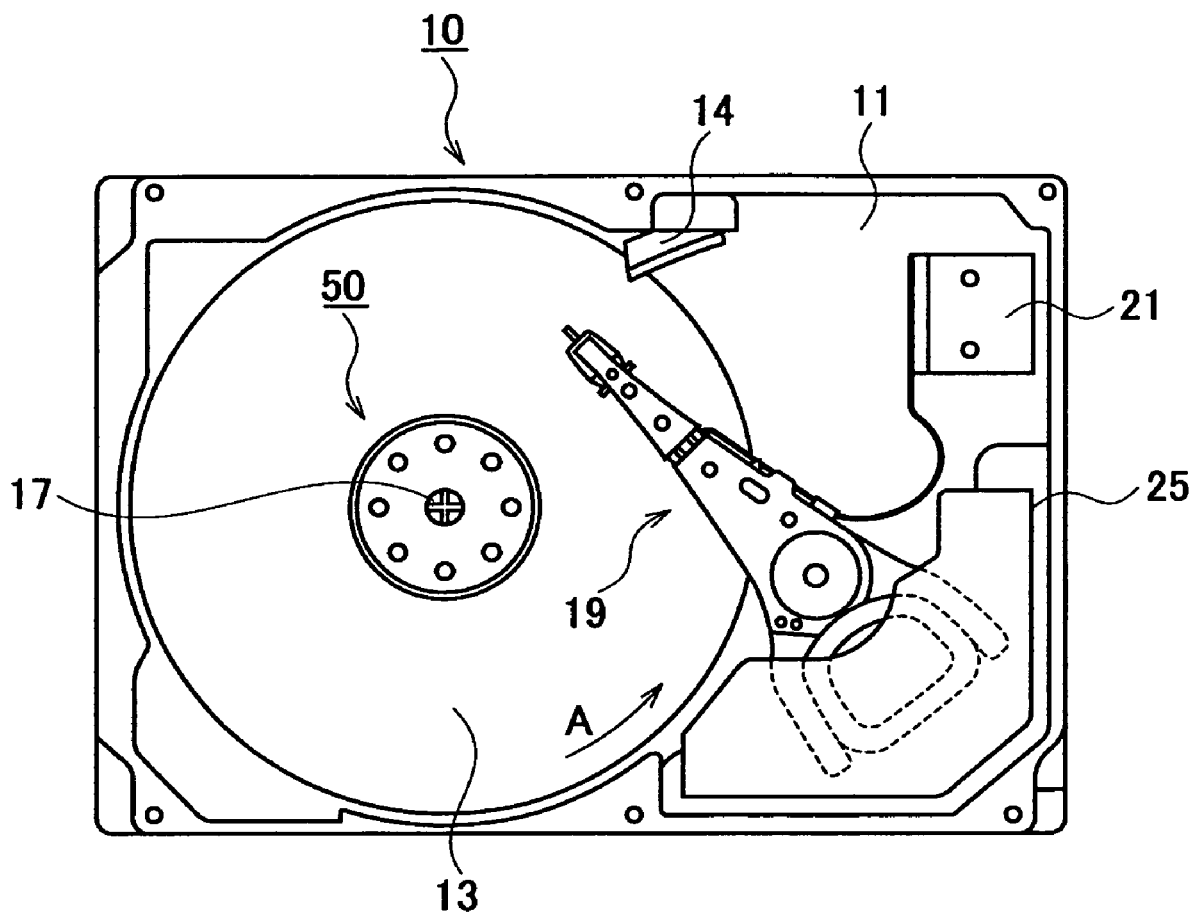
FIG. 1 is a plan view of a magnetic disk drive in an embodiment according to the present invention.
Figure 2:
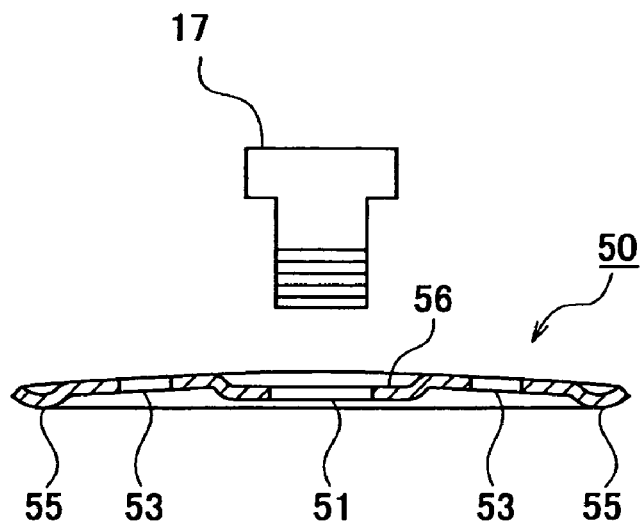
FIG. 2 is a view of a thin plate spring.
Figure 2:
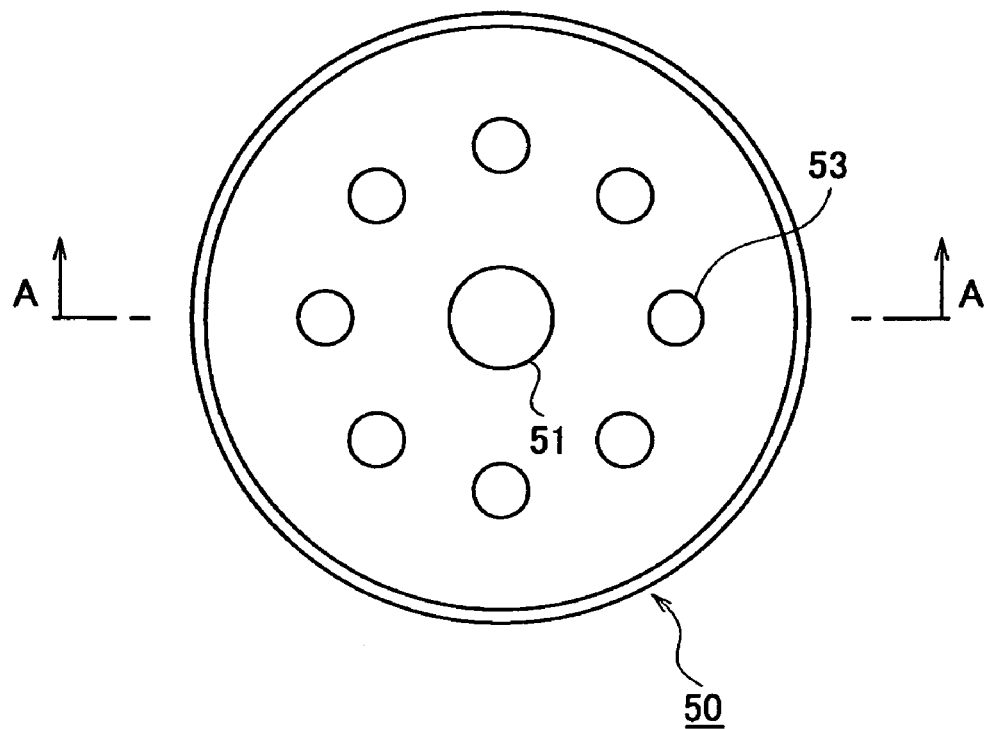
Figure 3:
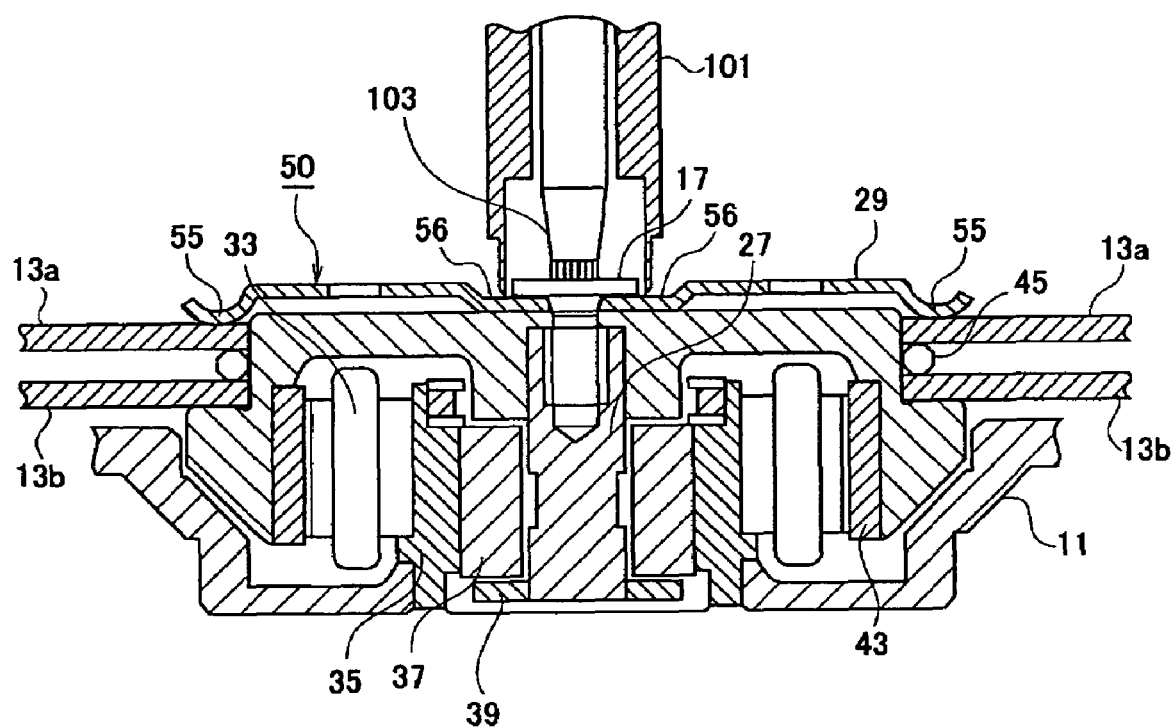
FIG. 3 is a sectional view of assistance in explaining operations for fastening a magnetic disk to a hub structure with a thin plate spring.

FIG. 1 is a plan view of an essential part of a magnetic disk drive 10 in an exemplary embodiment according to the present invention. FIGS. 2(A) and 2(B) are a sectional view and a plan view, respectively, of a thin plate spring 50. FIG. 3 is a sectional view of assistance in explaining operations for fastening a magnetic disk to a hub structure with the thin plate spring 50. A magnetic disk stack 13 (13*a*, 13*b*), a head stack assembly (hereinafter, abbreviated to "HSA") 19, a ramp 14, an external terminal 21 and a voice coil yoke 25 are arranged on a base 11. The magnetic disk drive 10 includes generally known components, but a process for tightening a fastening screw 17 included in a clamping mechanism is different from generally known ones.

As shown in FIG. 3, the magnetic disk stack 13 includes two magnetic disks 13a and 13b. The clamping mechanism for holding the magnetic disk stack 13 includes the dished, thin plate spring 50, the fastening screw 17 and a hub structure. As shown in FIG. 3, the hub structure includes a hub 29 and a shaft 27. The magnetic disk stack 13 clamped by the clamping mechanism is rotated in the direction of the arrow A by a spindle motor.

FIGS. 2(A) and 2(B) are a sectional view and a plan view, respectively, of the dished, thin plate spring 50 which is an essential part of the clamping mechanism. Shown also in FIG. 2(A) is the fastening screw 17. The dished, thin plate spring 50 is formed by processing a stainless spring steel sheet of about 0.5 mm in thickness and is about 20 mm in a diameter. The thin plate spring 50 has a shape resembling a circular dish having a central part curved relative to a peripheral part. The thin spring plate 50 has a depressed part 56 formed in a central part thereof and provided with a through hole 51 in its central part.

The depressed part 56 surrounding the through hole 51 has a flat surface. The flat depressed part 56 is used for deflection measurement. Eight through holes 53 of a small diameter are formed around the depressed part 56. The through holes 53 are used for restraining the thin plate spring 50 from turning when thin plate spring 50 is fastened by the fastening screw 17 and for balancing a rotary structure including the magnetic disks. A circumferential disk holding part 55 is formed in a peripheral part of the thin plate spring 50. A flexible part extends between the through hole 51 and the disk holding part 55.

The disk holding part 55 applies a fastening pressure to the magnetic disk 13a to fasten the magnetic disk stack 13 to the hub structure. When the thin plate spring 50 is placed on a flat surface with the disk holding part 55 in contact with the flat surface, a gap is formed between the central depressed part and the flat surface. Thus the flexible part is deflected elastically when the central depressed part is pressed toward the flat surface. An annular part, surrounding the through hole 51, of the thin plate spring 50 is a pressure-bearing part. When the fastening screw is screwed in a threaded hole of the hub 29, the head of the fastening screw pushes the pressure-bearing part and, consequently, the flexible part is deflected to depress the disk holding part 55 elastically.

In FIG. 3, the magnetic disks 13a and 13b are fastened to the hub 29 with the magnetic disks 13a and 13b spaced a predetermined distance apart from each other by a spacer ring 45. Rotor magnets 43 are attached to the inner surface of a side wall of the hub 29. The rotor magnets 43 and a stator coil 33 constitute the driving unit of the spindle motor. The stator coil 33 is fastened to the outer circumference of a bracket 35 fixedly held on the base 11.

A bearing 37 is fitted in a bore formed in the bracket 35. A shaft 27 pressed in the hub 29 is supported in the bearing 37. A thrust bearing 39 is fixed to the shaft 27 to bear a vertical thrust that acts on the shaft 27. The magnetic disks 13a and 13b are provided with central through holes, respectively. The magnetic disks 13a and 13b are put on the hub 29. The disk holding part 55 of the thin plate spring 50 is pressed against a part, around the through hole, of the magnetic disk 13a to fasten the magnetic disks 13a and 13b to the hub 29. The hub 29, the shaft 27, the bearing 37, the thrust bearing 39, the bracket 35, the rotor magnets 43 and the stator coil 33 are the component members of the spindle motor.

In the construction of the spindle motor shown in FIG. 3, the fastening screw 17 is screwed in a threaded hole formed in the shaft 27, the central part of the thin plate spring 50 is elastically distorted, and the resilience of the elastically distorted central part of the thin plate spring 50 pushes down the magnetic disk holding part 55. In FIG. 3, the threaded hole is formed in the shaft 27. Since the shaft 27 and the hub 29 are firmly joined together for simultaneous rotation, only the hub 29, both the hub 29 and the shaft, or only the shaft 27 may be subjected to a tapping process. A screw driving device 103 provided with a screw driving tool suitable for driving the fastening screw 17 at its free end, and a cylindrical sleeve 101 shown in FIG. 3 will be described later.

Figure 4:
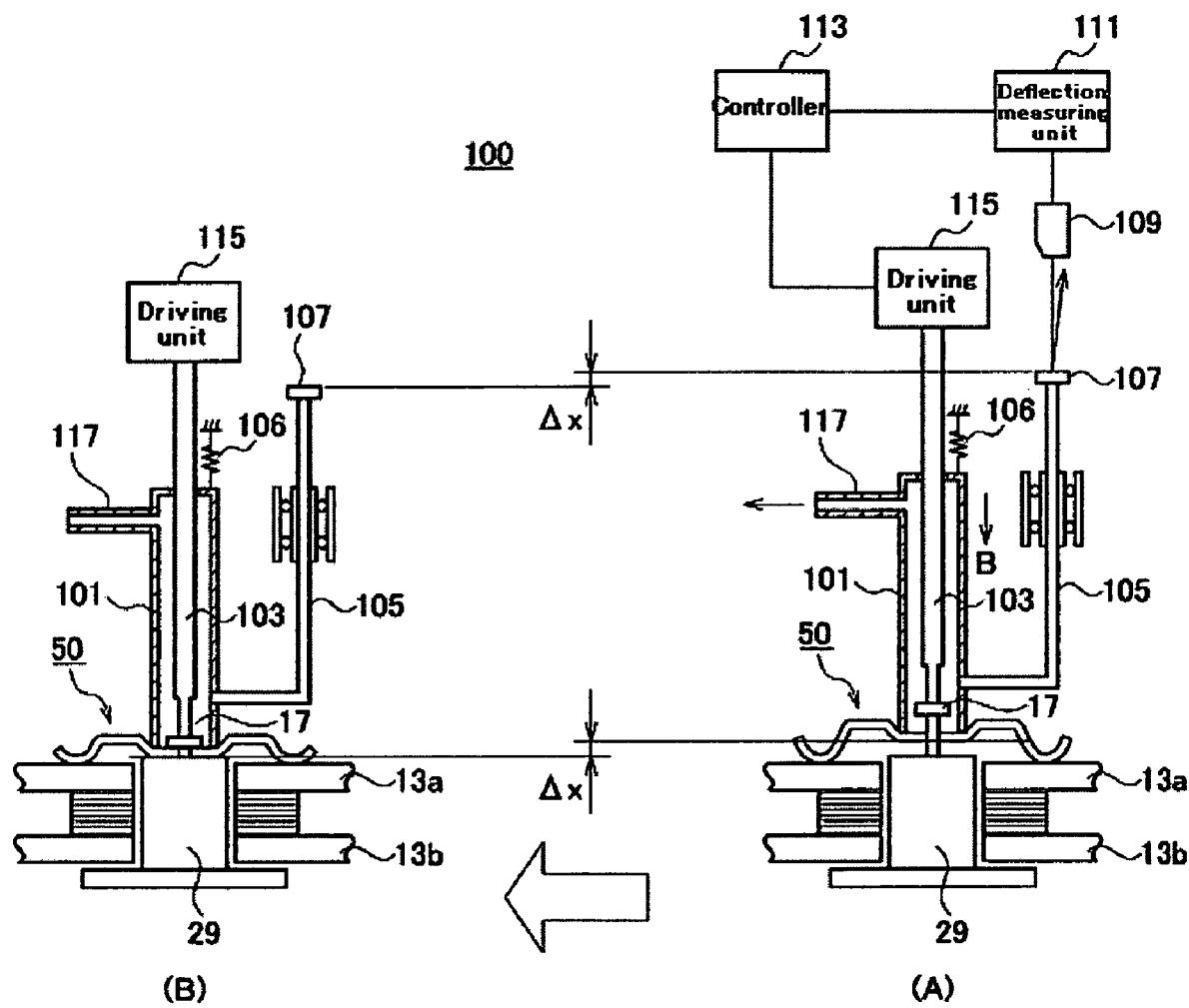
FIG. 4 is a block diagram of a magnetic disk attaching machine.
Figure 5:
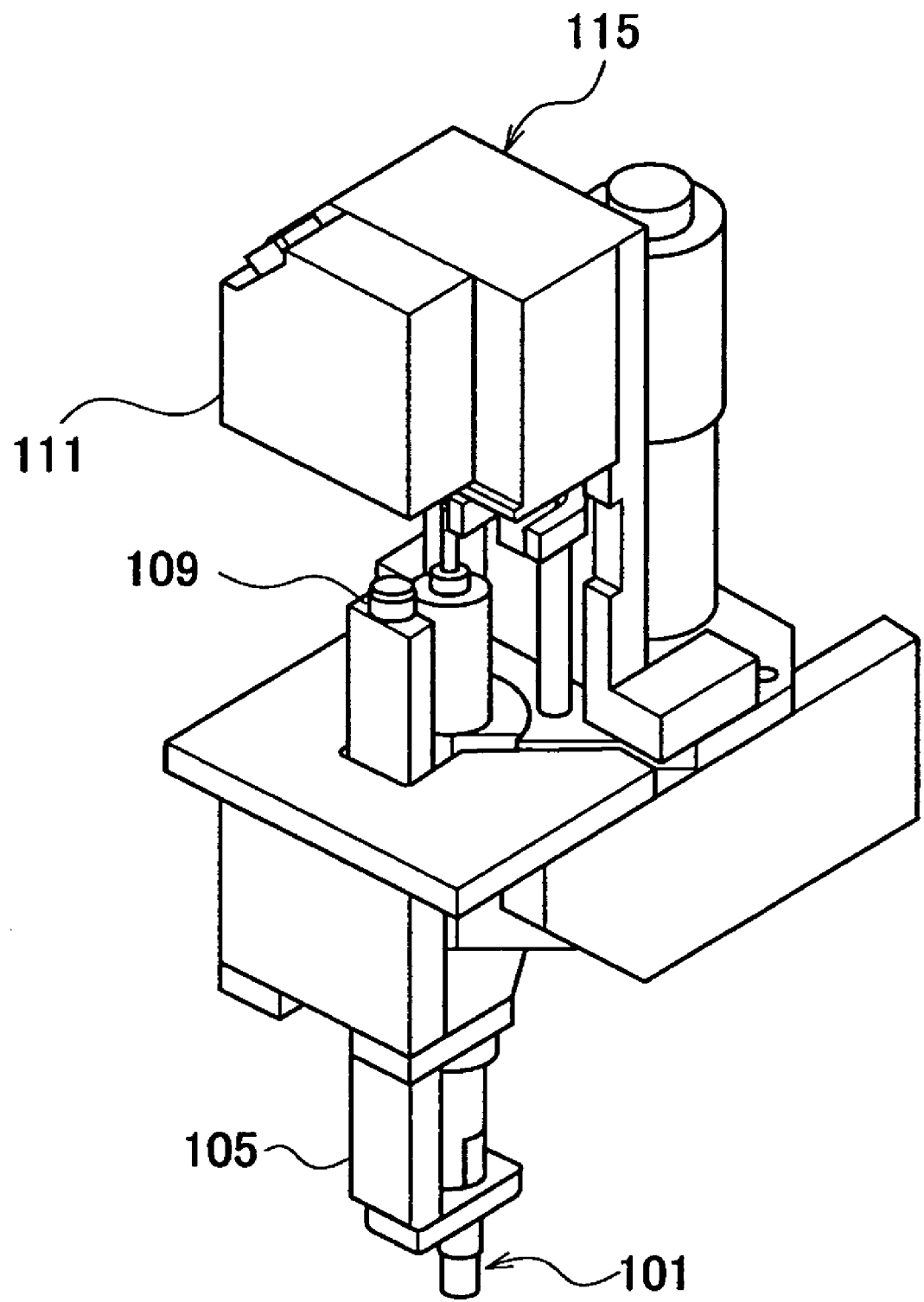
FIG. 5 is a perspective view of the magnetic disk attaching machine.

FIGS. 4(A) and 4(B) are block diagrams of a magnetic disk attaching machine 100 for fastening the magnetic disk to the hub structure in a state before the fastening screw is tightened and in a state after the fastening screw has been tightened to deflect the thin plate spring 50 by a predetermined deflection, respectively. FIG. 5 is a perspective view of the magnetic disk attaching machine 100. The magnetic disk attaching machine 100 includes a sleeve 101 having an open first end on the side of the thin plate spring 50 and a second end through which the screw driving device 103 extends into the sleeve 101. The screw driving device 103 includes a long shaft provided at its free end with a screw driving tool capable of snugly engaging in the slot of the head of the fastening screw 17. A driving unit 115 drives the screw driving device 103 for rotation.

The magnetic disk attaching machine 100 is provided with a pressing spring 106 for elastically pressing the sleeve 101 in the direction of the arrow B parallel to the axis of the fastening screw 17. The thin plate spring 50 is deflected in the direction of the arrow B when a fastening pressure is applied to the thin plate spring 50 in the direction of the arrow B. A probe 105 is connected to the sleeve 101 so as to move in the direction of the arrow B together with the sleeve 101. A reflecting surface 107 is formed in the free end of the probe 105. An air discharge pipe 117 connected to the sleeve 101 is connected to an evacuating device, not shown. An electromagnetic radiation send-receive device 109 projects a beam of electromagnetic radiation, such as an infrared ray or a laser beam, on the reflecting surface 107, receives the reflected beam and generates a distance signal representing the distance between the electromagnetic radiation send-receive device 109 and the reflecting surface 107. A deflection measuring unit 111 determines a displacement by which the reflecting surface 107 is displaced in the direction of the arrow B on the basis of the distance signal provided by the electromagnetic radiation send-receive device 109. A controller 113 controls general operations of the magnetic disk attaching machine 100.

Figure 6:
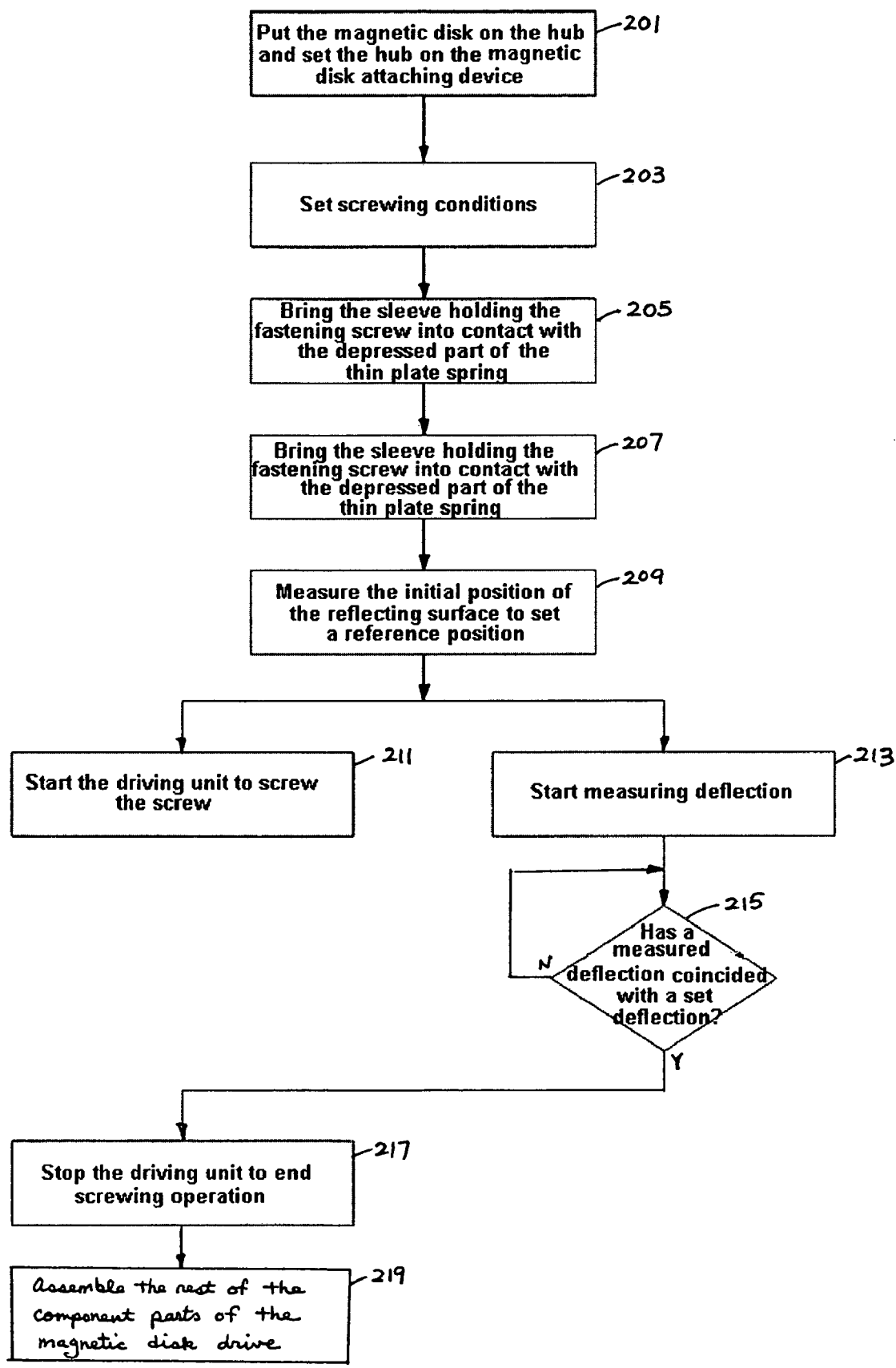
FIG. 6 is a flow chart of a magnetic disk drive producing method.

A magnetic disk drive producing method using the magnetic disk attaching machine 100 for producing the magnetic disk drive 10 will be described with reference to FIGS. 4 and 6. The magnetic disk drive producing method embodying the present invention is characterized by a step of fastening the magnetic disk to the hub structure, and the rest of the steps of the magnetic disk drive producing method may be the same as those of the generally known magnetic disk drive producing methods.

The component parts of the spindle motor including the bearing 37, the rotor magnet 43, the stator coil 33, the hub 29 and the shaft 27 are mounted on the base 11 in step 201. The magnetic disk 13b is put on the hub 29, the spacer ring 45 is put on the magnetic disk 13b, and then the magnetic disk 13a is put on the spacer ring 45 in step 203. Subsequently, the thin plate spring 50 put on the magnetic disk 13a such that the axis of the through hole 51 is aligned with the axis of the hub 29.

In step 205, data on magnetic disk fastening conditions including a desired deflection and the rotating speed of the screw driving device 103 are entered into the controller 113. The thin plate spring 50 is deflected by the sleeve 101 pressed by the pressing spring 106 against the thin plate spring 50 by a very small initial deflection not greater than about 5% of a desired deflection by which the thin plate spring 50 is deflected upon the completion of screwing the fastening screw in the threaded hole. This initial deflection is within a tolerance for a desired deflection of the thin plate spring 50. Therefore the proper management of the deflection of the thin plate spring 50 is not hindered by the initial deflection. The controller 113 may take into account the modulus of elasticity of the pressing spring 106 and the weight of the sleeve 101 for the management of the deflection.

In step 207, the sleeve 101 is evacuated at a negative pressure to hold the fastening screw 17 on the first end of the sleeve 101, the fastening screw 17 is aligned with the threaded hole of the shaft 27 and the sleeve 101 is brought into contact with the thin plate spring 50. The sleeve 101 is pressed lightly against the depressed part 56 of the thin plate spring 50 to depress the depressed part 56 slightly. Since the depressed part 56 has a flat surface, the sleeve 101 can be stably kept in contact with the depressed part 56. Therefore, the sleeve 101 will not be displaced from its correct position on the thin plate spring 50 and will not cause any measurement error at all while the fastening screw is being screwed in the threaded hole.

The sleeve 101 is in contact with a part, which is deflected greatly by the fastening pressure applied by the fastening screw 17 to the thin plate spring 50, of the thin plate spring 50, measurement error in the measured deflection is small and a desired fastening pressure can be accurately applied to the thin plate spring 50. In step 209, the electromagnetic radiation send-receive device 109 projects a beam of electromagnetic radiation on the reflecting surface 107 and receives the reflected beam of electromagnetic radiation, and the deflection measuring unit 111 determines the position of the reflecting surface 107 with respect to the direction of the arrow B on the basis of an electric signal received from the electromagnetic radiation send-receive device 109. This position is used as a reference position. In step 211, the driving unit 115 drives the screw driving device 103 for rotation to rotate the fastening screw 17 at a predetermined rotating speed. In step 213, the electromagnetic radiation send-receive device 109 continues sending the beam of electromagnetic radiation on the reflecting surface 107, and the deflection measuring unit 111 calculates the displacement of the reflecting surface 107 from the reference position and sends a signal representing the displacement of the reflecting surface 107 to the controller 113.

In step 215, the controller 113 monitors the displacement continuously to see if a deflection by which the thin plate spring 50 has been deflected is equal to a predetermined deflection $\Delta x$. Upon the coincidence of the deflection of the thin plate spring 50 with the predetermined deflection $\Delta x$, step 217 is executed. In step 217, the controller 113 sends a stop signal to the driving unit 115 to make the driving unit 115 stop driving the screw driving device 103. In this embodiment, a desired fastening pressure can be produced when the predetermined deflection $\Delta x$ is on the order of 0.2 mm. After the completion of a magnetic disk attaching operation in step 217, steps for assembling the rest of the component parts including the HSA 19, the ramp 14 and the external terminal 21 are carried out in step 219. Those steps to be carried out in step 219 may be carried out prior to the operations for attaching the magnetic disk to the hub structure.

The foregoing magnetic disk drive producing method controls the fastening pressure for pressing the magnetic disk against the hub structure by the clamping mechanism on the basis of the deflection of the thin plate spring directly representing the fastening pressure instead of the torque applied to the fastening screw indirectly representing the fastening pressure. Therefore, parameters affecting the actual fastening pressure are omitted and the magnetic disk can be fastened to the hub structure by a more accurate fastening pressure. Consequently, the magnetic disk will not be dislocated relative to the hub during operation due to the application of an excessively low fastening pressure to the magnetic disk and the magnetic disk will not be distorted due to the application of an excessively high fastening pressure to the magnetic disk.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk fastening method of fastening a magnetic disk to a hub structure, the magnetic disk fastening method comprising:

mounting the magnetic disk on the hub structure;

setting a thin plate spring having a pressure-bearing part, a flexible part and a disk holding part at a predetermined position relative to the magnetic disk with the disk holding part in contact with a surface of the magnetic disk;

pressing the pressure-bearing part of the thin plate spring toward the magnetic disk by screwing a fastening screw in a threaded hole formed in the hub structure;

measuring a deflection by which the flexible part of the thin plate spring is deflected during pressing of the pressure-bearing part; and stopping the pressing of the pressure-bearing part of the thin plate spring toward the magnetic disk upon an increase of the deflection to a predetermined value.

2. The magnetic disk fastening method according to claim 1, wherein the pressure-bearing part surrounds a through hole formed in the thin plate spring, and the fastening screw is screwed through the through hole in the threaded hole of the hub structure in pressing the pressure-bearing part.

3. The magnetic disk fastening method according to claim 1, wherein measuring the deflection measures a position of a probe changing according to the deflection of the flexible part.

4. The magnetic disk fastening method according to claim 3, wherein the probe is displaced according to the deflection of the flexible part surrounding the pressure-bearing part.

5. The magnetic disk fastening method according to claim 1, wherein the thin plate spring is a dished, thin plate spring provided with a through hole through which the fastening screw is passed in a central part thereof, the thin plate spring having a peripheral part serving as a disk holding part, and a flexible part extending between the through hole and the disk holding part.

6. A magnetic disk drive manufacturing method comprising:

attaching a hub structure to a base;

mounting a magnetic disk on the hub structure;

setting a thin plate spring having a pressure-bearing part to be pressed by a fastening screw, a flexible part and a disk holding part at a predetermined position relative to the magnetic disk with the disk holding part in contact with a surface of the magnetic disk;

pressing the magnetic disk with the pressure-bearing part by screwing a fastening screw in a threaded hole formed in the hub structure;

measuring a deflection by which the flexible part is deflected in pressing the magnetic disk; and stopping pressing the magnetic disk upon an increase of the deflection to a predetermined value.

7. The magnetic disk drive manufacturing method according to claim 6, wherein measuring the deflection measures a position of a probe changing according to the deflection of the flexible part.

8. The magnetic disk drive manufacturing method according to claim 7, wherein the probe is displaced according to the deflection of the flexible part surrounding the pressure-bearing part.

9. The magnetic disk drive manufacturing method according to claim 7, wherein the probe has a reflecting surface capable of reflecting a beam of electromagnetic radiation for deflection measurement, and wherein measuring the deflection comprises projecting a beam of electromagnetic radiation on the reflecting surface of the probe and receiving a reflected beam from the reflecting surface.

10. The magnetic disk drive manufacturing method according to claim 6, wherein the pressure-bearing part surrounds a through hole formed in the thin plate spring, and the fastening screw is screwed through the through hole in the threaded hole of the hub structure in pressing the magnetic disk with the pressure-bearing part.

11. The magnetic disk drive manufacturing method according to claim 6, wherein the thin plate spring is a dished, thin plate spring provided with a through hole through which the fastening screw is passed in a central part thereof, the thin plate spring having a peripheral part serving as a disk holding part, and a flexible part extending between the through hole and the disk holding part.

12. The magnetic disk drive manufacturing method according to claim 6, wherein pressing the magnetic disk comprises:

providing a sleeve internally holding a screw driving member for driving the fastening screw;

elastically pressing the sleeve against the flexible part of the thin plate spring so as to deflect the flexible part; and screwing the fastening screw in the threaded hole formed in the hub structure with the flexible part deflected by elastically pressing the sleeve against the flexible part.

13. The magnetic disk drive manufacturing method according to claim 12, wherein a deflection by which the thin spring plate pressed by the sleeve is deflected is not greater than about 5% of a deflection at the completion of fastening the magnetic disk with the fastening screw.

14. The magnetic disk drive manufacturing method according to claim 12, further comprising setting an interior space of the sleeve at a negative pressure after inserting the fastening screw in the sleeve to hold the fastening screw temporarily by the sleeve.

* * * * *